United States Patent [19]

Gentry

[11] 4,032,494

[45] June 28, 1977

[54] LIQUID SILOXANES AS ADDITIVES FOR CURABLE POLYESTER MOULDING COMPOSITIONS CONTAINING VINYL ACETATE POLYMER AND UNSATURATED MONOMER

[75] Inventor: Robert Ray Gentry, Saint Albans, W. Va.

[73] Assignee: Union Carbide Corporation, New York, N.Y.

[22] Filed: Mar. 3, 1976

[21] Appl. No.: 663,454

[52] U.S. Cl. .................... 260/29.1 SB; 260/37 SB; 260/40 R; 260/42.18; 260/42.26; 260/75 SB; 260/827; 260/862
[51] Int. Cl.² ........................................ C08L 67/06
[58] Field of Search ............. 260/827, 862, 75 SB, 260/29.1 SB, 42.18, 375 SB, 40 R, 42.26

[56] References Cited

UNITED STATES PATENTS

| 2,937,230 | 5/1960 | Rogers, Jr. ..................... 260/827 |
| 3,332,900 | 7/1967 | Reischl et al. .............. 260/29.1 SB |
| 3,718,714 | 2/1973 | Comstock et al. ................ 260/862 |
| 3,919,438 | 11/1975 | Urkevich ........................... 260/827 |

OTHER PUBLICATIONS

Def. Pub.–T941,003, Dec. 1975, T. Davis.

Primary Examiner—Joseph L. Schofer
Assistant Examiner—Peter F. Kulkosky
Attorney, Agent, or Firm—Bernard Francis Crowe

[57] ABSTRACT

Liquid siloxanes are employed as additives in polyester composites containing vinyl acetate polymers.

24 Claims, No Drawings

LIQUID SILOXANES AS ADDITIVES FOR CURABLE POLYESTER MOULDING COMPOSITIONS CONTAINING VINYL ACETATE POLYMER AND UNSATURATED MONOMER

The invention relates to the art of polyesters. More particularly, the invention relates to the use of liquid siloxanes as additives in polyester composites that contain vinyl acetate polymers.

Polyester composites containing vinyl acetate polymers are important commercially. For instance, one of the most important classes of low profile additives for polyesters are the vinyl acetate polymers, both homopolymers and copolymers. (Low profile additives are used to reduce shrinkage in the mold and to improve the smoothness of the molded part.) Molded polyester articles containing vinyl acetate polymers not only have excellent reproduction of the surface contours of the mold, they also have good impact strength, excellent receptiveness to paints, and in general a good balance of physical properties.

However, one characteristic of vinyl acetate polymers has tended to limit their use as additives in polyesters. Because vinyl acetate polymers are relatively hydrophilic, polyester parts containing such polymers absorb more water than is desired for some end-use applications. The present invention provides a means for substantially reducing the water absorption of polyester composites containing vinyl acetate polymer additives.

In accordance with the invention, in one aspect there is provided curable compositions containing:
a. a polyester resin.
b. a monomer that is copolymerizable with the polyester resin;
c. a vinyl acetate polymer; and
d. a liquid siloxane.

In another aspect, there is provided cured polyester composites comprising the cured reaction products of said curable compositions.

The polyesters that are employed in the invention are reaction products of a dicarboxylic acid anhydride, with a polyhydric alcohol. The dicarboxylic acids or anhydrides that are employed to produce the polyester, either singly or in combination, must include those that contain olefinic unsaturation, preferably wherein the olefinic unsaturation is alpha, beta- to at least one of the carboxylic acid groups. Such acids include maleic acid or anhydride, fumaric acid, tetrahydrophthalic acid or anhydride hexachloroendomethylene tetrahydropthhalic anhydride ("chlorendic anhydride"), Diels-Alder adducts of maleic acid or anhydride with compounds having conjugated olefinic unsaturation, such adducts being exemplified by bicyclo [2.2.1]hept-5-ene-2,3-dicarboxylic anhydride, methyl maleic acid, and itaconic acid. Maleic acid or anhydride and fumeric are the most widely used commercially.

In addition to the olefinicaly unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

A polyol is also employed to produce the polyester. Such polyols include ethylene glycol, diethylene glycol, proplyene glycol, dipropylene glycol, butylene glycols, neopentyl glycol, glycerol and 1,1,1-trimethylolpropane. As a rule, not more than about 20 mole percent of the polyol be a triol, with the remainder being one or more diols.

Polyesters employed in this invention preferably are those that are suitable for use in molding. Their nature and preparation are well known in the art. As a general rule, low profile additives are needed most in fairly reactive polyester systems, e.g., those wherein at least two-thirds of the dicarboxylic acid moieties contain olefinic double bonds, and which have molecular weights of the order of about 500 to about 2000. Thus, the invention is most applicable to such systems wherein the low profile additive is a vinyl acetate polymer. However, the invention can be employed in any polyester system that contains a vinyl acetate polymer additive, and which can benefit from the improvements provided by the invention.

The polyester composition of the invention also contains a monomer that contains ethylenic unsaturation, and which is copolymerizable with the polyester. Styrene is the preferred monomer in commercial practice today, although others can be used. Such others include vinyl toluene, methyl methacrylate, chlorostyrene, and diallyl phthalate.

The said monomer is employed in the polyester composition for the purpose of dissolving the polyester (which is a solid at ambient temperatures, i.e., about 20°-25°C.) to ensure that the polyester composition is a fluid. Enough monomer is employed so that the thickness or viscosity of the fluid is such that the fluid can be processed conveniently. Excessive amounts of the monomer are normally to be avoided, because such excess can have an adverse effect on properties. For instance, too much of the monomer may tend to cause embrittlement of the cured polyester. Within these guidelines, effective proportions of the monomer are normally found within the range of from about 40 to about 60 weight per cent, based on weight of polyester plus monomer.

The polyester composition may also contain one or more of the known types of conventional additives, which are employed for their known purposes in the usual amounts. The following are illustrative of such additives:

1. Polymerization initiators such as t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.5 to about 2 to 3 weight percent, based on the weight of polyester plus monomer;

2. Pigments and fillers, such as clay, hydrated alumina, silica, calcium carbonate, various pigments such as iron oxide, titanium dioxide, and carbon black, and others known to the art;

3. Reinforcing fillers such as glass fibers or fabrics, asbestos fibers or fabrics, various organic fibers or fabrics such as those made of polypropylene, acrylonitrile/vinyl chloride copolymer, and others known to the art;

4. Thickening agents such as the oxides and hydroxides of the metals of Groups I, II and III of the Periodic Table. Specific illustrative examples of thickening agents include magnesium oxide, calcium oxide, zinc oxide, barium oxide, potassium oxide, magnesium hydroxide, and others known to the art. Thickening agents are normally employed when the polyester molding composition is employed in a sheet molding application; and 5. Mold release agents or lubricants, such as zinc stearate, calcium stearate, and others known to the art.

The third essential component of the invention is a vinyl acetate polymer, preferably as a low profile additive. Such polymers include vinyl acetate homopolymers; vinyl acetate/vinyl chloride copolymers; copolymers of vinyl acetate and ethylenically unsaturated carboxylic acids such as acrylic acid, methacrylic acid, maleic acid, itaconic acid, and the like; vinyl acetate/vinyl chloride/maleic acid terpolymer, vinyl acetate/vinyl chloride/glycidyl acrylate terpolymer, and other terpolymers. Reference is made to Comstock et al., U.S. Pat. No 3,718,714 and Comstock et al. British Pat. No. 1,361,841, for descriptions of vinyl acetate polymer low profile additives.

The useful vinyl acetate poylmer low profile additives ordinarily have molecular weights within the range of from about 10,000 to about 250,000, and preferably from about 25,000 to about 175,000. They are usually employed in proportions of from about 8 to 18, and preferably from about 10 to 14, weight per cent, based on weight of polyester plus monomer plus low profile additive.

As a general rule, the solution polymerized vinyl acetate polymers are preferred in commercial practice because of their better batch-to-batch uniformity.

The major point of novelty of the invention resides in the incorporation in the above-described polyester systems of a small amount of a liquid siloxane. Any siloxane that is a liquid at polyester curing temperatures (about 200°–350°F. or 92°–250°C.) and will neither decompose nor excessively volatilize during the curing cycle of the polyester, can be employed in the invention. The most convenient siloxanes are those that are liquid at ambient temperatures, i.e., about 25°–30°C.

There are a whole host of liquid siloxanes available commercially. It is impossible to describe them all, but it is believed that any liquid siloxane will be operative in the invention. Every liquid siloxane that has been tried has exhibited at least some of the benefits of the invention.

The description below of various classes of siloxanes is representative of the siloxanes that can be used in the invention.

One class of liquid siloxanes that can be used in the invention are those that are represented by the formula:

wherein each M individually represents a monovalent chain terminating unit wherein D represents a divalent siloxane unit, and wherein $n$ represents a positive number. The chain of polysiloxane units may be composed of repeating units of the same siloxane or a random or block mixture of two or more different siloxane units.

Specific illustrative compositions that are include within Formula I are the dimethylsilicone oils:

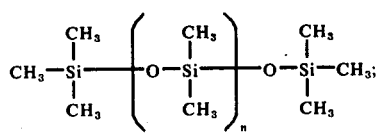

the dimethylamine-terminated dimethyl silicone oils:

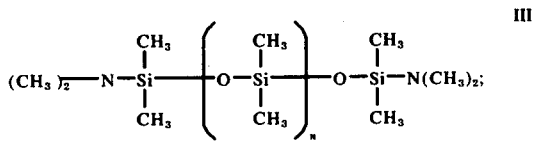

the methylvinyl silicone oils:

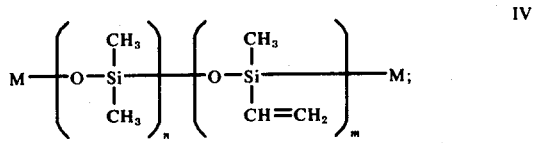

wherein $m$ is a positive number, and wherein M and $n$ are as defined above; the hydroxyl-terminated dimethylsilicone oils:

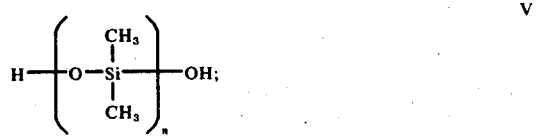

and the like.

Another broad class of liquid siloxanes that can be used in the invention can be represented by the formula:

Wherein D, $n$ and M are as defined above, wherein T is a trivalent siloxane unit, and wherein $m$ is a positive number.

Specific illustrative compositions that are within Formula VI are those that are represented by the formula:

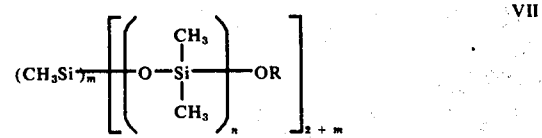

wherein R is an alkyl group, and wherein $m$ and $n$ are as defined above.

The nature and production of the siloxanes employed in the invention are known. For instance, see Rochow, "Chemistry of the Silicones", 2nd Edition, John Wiley & Sons, Inc., especially Chapter 5; Meals et al., "Silicones", Reinhold Publishing Corp., especially Chapter 3; the Kirk-Othmer "Encyclopedia of Chemical Technology", 1st Edition, Volumn 12, pages 394 et seq.; Eaborn, "Organosilicon Compounds", Academic Press Inc., pages 454 et seq.; Creamer, U.S. Pat. Nos. 3,451,964 and 3,467,686; and Borchert, U.S. Pat. 3,350,092.

The liquid siloxane is employed in the polyester compositions of the invention in a small amount, sufficient to reduce the water absorption (as hereinbelow defined) of the cured polyester composites of the invention. For instance, the beneficial effects of the invention are usually observed in amounts as little as 0.5 weight percent, based on weight of vinyl acetate polymer contained in the polyester composition. It is rare that the siloxane will be employed in proportions of more than about 10 weight percent, based on weight of vinyl acetate polymer, because the siloxanes are usually relatively expensive and no significant advantage is to gained from using more. Preferred proportions are usually found within about 1.25 to 5 weight percent.

The polyester compositions of the invention can be cured under conditions similar to those used for known polyester compositions. Typical curing conditions are a temperature of from about 200° to 350°F. for 2 to 4 minutes at a pressure of 500 to 2000 psi.

The examples below illustrate the practice of the invention and the benefits that can be realized thereby.

In the experiments reported in the examples, the following materials were used:

Polyester A — made from maleic anhydride and propylene
  glycol in molar proportions of 1:1.1 (maleic:glycol);

Polyester B — made from isophthalic acid, maleic anhydride, diethylene glycol, and ethylene glycol in molar proportions of 1:2:2.9:0.4, respectively;

Polyester C — made from maleic anhydride and propylene glycol in molar proportions of 1:1,1. respectively;

(Polyesters A and C are different commercial resins having essentially the same properties.)

The properties of these polyester resins are the following:

Polyester A
Acid Number 19.8
Solids Content 65.6% (in styrene)
Molecular weight/double bond ratio 156

Polyester B
Acid Number 13.8
Solids Content 70±1.5% (in styrene)

Polyester C
Acid Number 22.5
Solids Content 65.6% (in styrene)
Molecular weight $M_N$ 1460
Molecular weight/double bond ration 156 Viscosity 1070 centipoises "Zelec UN" — A phosphate-containing mold release agent commercially available from duPont;

"Al-Sil-Ate-Lo" — a clay filler commercially available from Freeport Kaolin & Co.;

"Camel Wite" — Finely divided calcium carbonate used commercially as a filler in polyesters;

"L-256" — 2,5 -Dimethyl-2,5-di(2-ethylhexanoyl-peroxy)hexane;

LP-A —L0 40 weight per cent solids solution of a 99.2/0.8(by weight9 vinyl acetate/acrylic acid copolymer in styrene, having the following properties:
  Viscosity 4-6000cps
  Inherent viscosity 0.48-.56 17-21 Ford cup
  $M_N$ 42,000-55,000
  $M_W$ 92,000-115,000

LP-B — 40 weight per cent solids solution of vinyl acetate homopolymer in styrene. The homopolymer had about the same molecular weight as the copolymer in LP-A..

The liquid siloxanes that are employed in the experiments were the following:

I. A series of six N,N-dimethylamine end-capped dimethyl siloxanes of the formula:

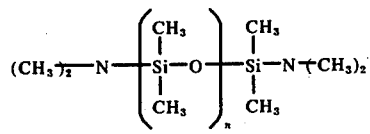

The average values of n and the approximate molecular weights of these siloxanes are as follows:

| Siloxane | n | Molecular weight |
|---|---|---|
| A | 2.5 | 400 |
| B | 15 | 1420 |
| C | 19 | 1690 |
| D | 37 | 3030 |
| E | 100 | 7720 |
| F | 143 | 10,860 |
| G | 309 | 23,150 |

II. A siloxane having the average formula:

Siloxane H

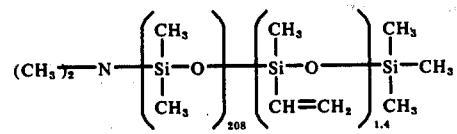

(molecular weight - about 15,700)

III. Four dimethyl silicone oils of the formula:

| Siloxane | Viscosity, centistokes at 25° C. |
|---|---|
| I | 50 |
| J | 100 |
| N | 20 |
| O | 200 |

Siloxane K
$T_{1.3}D_{19}M_{3.3}$ wherein T is

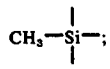

wherein D is

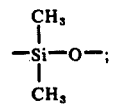

wherein M is ethoxy.
(molecular weight - about 1900)

V. Two siloxanes of the formula:

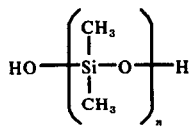

Siloxane L — n is 114; molcular/weight about 8500
Siloxane P — n is 32.
VI. A siloxane of the formula:

Siloxane M

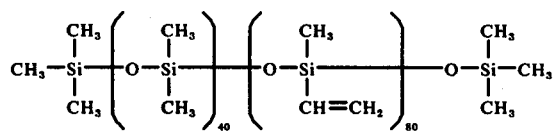

(molecular weight - about 10,000)

Standard Experimental Procedure

The following materials were blended to a paste by stirring with a Cowles dissolver (spinning propellor type) in a one-pint metal paint can:

| Material | Parts, by Weight |
|---|---|
| Polyester A | 32.5 |
| Polyester B | 188 |
| LP-A | 96.5 |
| Styrene | 7 |
| Camel Wite | 109 |
| Al-Sil-Ate-LO | 109 |
| Black iron oxide | 0.55 |
| L-256 | 2 |
| Zelec UN | 0.9 |
| Siloxane | (as indicated) |

Three 12-inch by 12-inch squares of Owens Corning Fiberglass glass mat 8610 were cut and stacked one on top of the other, the paste was poured on top of the stack, and a thin glass veil was then placed on top. (The glass constituted 70 weight percent of the total weight of the glass plus paste.) The composites were then molded for 3 minutes at 235°F. under a pressure of 500 psi The cured composite was cooled to ambient temperature (about 25°C.) on a flat surface under modes pressure, to guard against warping. The panels were then subjected to the following tests:
1. Water absorption
2. Surface smoothness
3. Notched Izod impact ASTM D-256 (Method A)
4. Flexural Strength and Modulus —ASTM D-790-66
5. Paint Adhesion
6. Visual observation The procedures for determining water absorption, surface smoothness, and paint adhesion are as follows:
Water Absorption Test. Two 5 inch ×½inch strips were cut from the molded panel with a bandsaw. The bandsaw marks were filed from the strips and the excess powder blown off with air. The strip was wiped clean with a tissue and dried for one hour in an oven at 125°C. The strip was then cooled, weighed, and submerged in distilled water at room temperature for 24 hours. The strips were then wiped dry with tissues and were weighed on the balance. The weight gain was calculated as percent water absorption.

Surface Smoothness (MCR). The surface smoothness was determined with a Bendix microcorder surface analyzer. A diamond stylus is passed over the surface of the molded panel and the stylus moves up and down with the contour of the panel. These hills and valleys are recorded and the deviations from the base line calculated and reported as MCR. A value of less than 400 MCR is desirable. Paint Adhesion. Two 4 inch 33 inch strips were cut from the molded panel and were cleaned of all foreign matter by a solvent wipe with a lint-free cloth dampened with Sherwin Williams Opex lacquer thinner. The panels were air dried and then sprayed with two coats (one double pass) of Inmont's conductive primer UD4KD004. Panels were allowed to flash dry at room temperature for five minutes and then were baked in an oven at 300°F. for 45 minutes. Panels were then allowed to cool to room temperature overnight. Next the strips were scuff sanded with No. 320 grit paper and then coated with Ford ESBM-50J-1-1724 black automotive topcoat (1 double pass). Panels were then air dried for 5–7 minutes at room temperature and then baked 25 minutes at 260°F. After cooling overnight the painted portion was subjected to crosshatch test. Eleven razor blades are blocked together 1/16 inch apart. These blades are used to cut a 2:3 -inch path horizontally, vertically and diagonally on the painted surface. A piece of special adhesion tape is applied to this cut area and is then removed with a rapid movement. The number of paint squares removed is a measure of the paint adhesion. All of the panels containing the silicone fluids gave excellent paint adhesion

EXAMPLE 1

The table below displays the liquid siloxane additives, their concentration, based on weight of vinyl acetate polymer, and the results of the physical property tests described above:

TABLE I

| Run No. | Siloxane | Siloxane Concentration | Water Absorption, Per cent | MCR | Notched Izod Impact | Flex Modulus 105 psi | Paint Adhesion | Flex Strength, Psi | Comments |
|---|---|---|---|---|---|---|---|---|---|
| 1 | none | 0 | 5.36 | 403 | 13.79 | 9.89 | Excellent | 18,642 | — |
| 2 | G | 5.0 | 0.83 | 230 | — | — | — | — | — |
| 3 | G | 2.5 | 0.98 | 180 | — | — | — | — | — |
| 4 | G | 1.25 | 3.71 | 300 | — | — | — | — | — |
| 5 | A | 5.0 | 0.61 | 390 | — | — | — | — | Molded at 300° F. |
| 6 | A | 2.5 | 1.13 | 310 | — | — | — | — | Molded at 200° F. |
| 7 | A | 5.0 | 0.83 | 360 | — | — | — | — | — |
| 8 | A | 2.5 | 1.03 | 290 | — | — | — | — | — |
| 9 | B | 5.0 | 0.77 | 120 | — | — | Excellent | — | — |
| 10 | C | 5.0 | 0.80 | 125 | 13.31 | 10.09 | — | 22,237 | — |
| 11 | D | 5.0 | 0.80 | 158 | — | — | Excellent | — | — |
| 12 | E | 5.0 | 0.99 | 130 | 13.22 | 11.3 | — | 24,129 | — |
| 13 | F | 5.0 | 0.72 | 134 | — | — | Excellent | — | — |
| 14 | H | 5.0 | 0.78 | 185 | 13.87 | 10.7 | — | 24,434 | — |

TABLE I-continued

| Run No. | Siloxane | Siloxane Concentration | Water Absorption, Per cent | MCR | Notched Izod Impact | Flex Modulus 10⁵ psi | Paint Adhesion | Flex Strength, Psi | Comments |
|---|---|---|---|---|---|---|---|---|---|
| 15 | K | 5.0 | 0.67 | 225 | 13.08 | 11.0 | — | 25,629 | — |
| 16 | M | 5.0 | 0.83 | 325 | — | — | Excellent | — | — |
| 17 | L | 5.0 | 0.72 | 319 | 12.76 | 11.4 | — | 24,588 | — |
| 18 | J | 5.0 | 1.12 | 185 | 14.43 | 11.2 | — | 26,068 | — |
| 19 | I | 5.0 | 0.91 | 171 | — | — | Excellent | — | — |
| 20 | I | 2.5 | 0.91 | 170 | — | — | — | — | — |
| 21 | I | 1.25 | 1.01 | 263 | — | — | — | — | — |

Runs 5–8 had poor surfaces, probably because the high dimethylamine content of the siloxane accelerated the decomposition of the peroxide.

EXAMPLE 2

An additional series of polyester composites was made by a procedure analogous to that described above, except that the polyester portion of the formulation varied as shown on the table below. The table displays the polyesters used, the nature and proportion of the siloxane (proportion based on weight of vinyl acetate polymer contained in the low profile additive, which in all cases except Run 20 was LP-A), the MCR, and water absorption of the panels.

TABLE II

| Run No. | Polyester, % B | A | C | Siloxane Nature | Per Cent | MCR | % Water Absorption | | |
|---|---|---|---|---|---|---|---|---|---|
| 1 | 100 | — | — | none | — | 486 | 1.76 | Smooth, semi-gloss | |
| 2 | 100 | — | — | I | 5 | 154 | 1.02 | Smooth, semi-gloss | uniform pigmentation |
| 3 | 100 | — | — | B | 5 | 396 | 0.82 | Smooth, semi-gloss | uniform pigmentation |
| 4 | 85 | 15 | — | none | — | 203 | 4.31 | Smooth, semi-gloss | uniform pigmentation |
| 5 | 85 | 15 | — | I | 5 | 200 | 0.80 | Smooth, good gloss | uniform pigmentation |
| 6 | 85 | 15 | — | I | 2.5 | 170 | 0.91 | Smooth, good gloss | uniform pigmentation |
| 7 | 85 | 15 | — | I | 1.25 | 263 | 1.03 | Smooth, good gloss | uniform pigmentation |
| 8 | 85 | 15 | — | I | 5 | 210 | 0.78 | Smooth, good gloss | uniform pigmentation |
| 9 | 85 | 15 | — | L | 5 | 153 | 0.67 | Smooth, good gloss | |
| 10 | 85 | 15 | — | I | 5 | 115 | .63 | Peroxide doubled-better panel | |
| 11 | 85 | 15 | — | B | 5 | 300 | 0.80 | Smooth, good gloss | uniform pigmentation |
| 12 | — | 100 | — | B | 5 | 216 | 2.90 | Smooth, high gloss | uniform pigmentation |
| 13 | — | 100 | — | I | 5 | 70 | 3.42 | Smooth, high gloss | uniform pigmentation |
| 14 | — | 100 | — | K | 5 | 115 | 2.90 | Smooth, high gloss | uniform pigmentation |
| 15 | — | — | 100 | K | 5 | 221 | 5.15 | Smooth, high gloss | uniform pigmentation |
| 16 | — | — | 100 | B | 5 | 248 | 4.84 | Smooth, high gloss | uniform pigmentation |
| 17 | — | — | 100 | none | — | 99 | 7.16 | Smooth, high gloss | uniform pigmentation |
| 18 | — | 100 | — | none | — | 260 | 6.67 | Smooth, high gloss | uniform pigmentation |
| 19 | 100 | — | — | none | — | 500 | 0.96 | (LP-B low profile additive) smooth, high | |
| 20 | 85 | 15 | — | I | 5 | 225 | 0.86 | gloss, uniform pigmentation | |

EXAMPLE 3

An additional series of polyester composites was made by a procedure analogous to that described above. The polyester, low profile additive, the nature and proportion of siloxane (based on weight of vinyl acetate polymer), the MCR, and water absorption of the panels are displayed below in Table III.

TABLE III

| Run | Polyester B | A | C | Low Profile Additive | Siloxane | MCR | % Water Absorption |
|---|---|---|---|---|---|---|---|
| 1 | 0 | 0 | 100 | LP-A | None | 250 | 7.16 |
| 2 | 0 | 100 | 0 | LP-A | None | 260 | 6.67 |
| 3 | 100 | — | — | LP-A | None | 500 | .95 |
| 4 | 85 | 15 | — | LP-A | 2% Siloxane N | 175 | .80 |
| 5 | 85 | 15 | — | LP-A | 2% Siloxane O | 160 | .65 |
| 6 | 85 | 15 | — | LP-A | 2% Siloxane I | 165 | .78 |
| 7 | 85 | 15 | — | LP-B | 2% Siloxane I | 225 | .86 |
| 8 | 85 | 15 | — | LP-A | 2% Siloxane P | 180 | .78 |

What is claimed is:

1. A curable molding composition containing:
   a. a polyester resin that is suitable for use in molding and which comprises the reaction product of an olefinically unsaturated dicarboxylic acid or anhydride and a polypol;
   b. an olefinically unsaturated monomer that is copolymerizable with said polyester resin;
   c. a vinyl acetate polymer having a molecular weight within the range of from about 10,000 to about 250,000; and
   d. a liquid siloxane, wherein the liquid siloxane is employed in said curable molding composition in an amount sufficient to reduce the water absorption of the cured composite produced by curing said curable molding composition, said amount being within the range of from about 0.5 to about 10 weight percent, based on weight of said vinyl acetate polymer.

2. The curable composition of claim 1 wherein said unsaturated monomer is styrene.

3. The curable composition of claim 2 wherein said vinyl acetate polymer is a member of the group consisting of vinyl acetate homopolymers, vinyl chloride/vinyl acetate copolymers, copolymers of vinyl acetate and an ethylenically unsaturated carboxylic acid, vinyl chloride/ vinyl acetate/maleic acid terpolymer, vinyl chloride/vinyl acetate/glycidyl arcylate terpolymer, and mixtures thereof.

4. The curable composition of claim 1 wherein said liquid siloxane is a composition of the formula:

M(D)$_n$M wherein each M individually represents a monovalent chain terminating unit, wherein D represents a divalent siloxane unit, and wherein n represents a positive number.

5. The curable composition of claim 4 wherein the liquid siloxane is a dimethyl silicone oil of the formula:

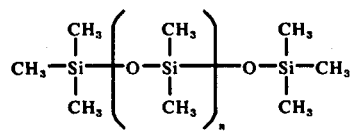

wherein n represents a positive number.

6. The curable composition of claim 4 wherein the liquid siloxane is a dimethylamine-terminated dimethyl silicone oil of the formula:

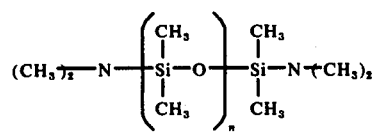

wherein n represents a positive number.

7. The curable composition of claim 4 wherein the liquid siloxane is a composition of the formula:

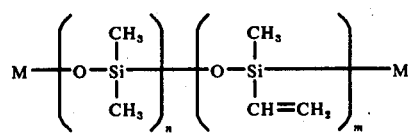

wherein n and m represent positive numbers, and wherein each M individually represents a monovalent chain terminating unit.

8. The curable composition of claim 4 wherein the liquid siloxane is a hydroxyl-terminated dimethyl silicone oil of the formula:

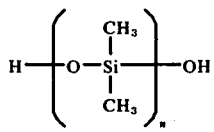

wherein n represents a positive number.

9. The curable composition of claim 1 wherein the liquid siloxane is a composition of the formula:

wherein m and n are positive numbers, wherein T is a trivalent silocane unit, wherein D is a divalent siloxane unit, and wherein M is a monovalent chain terminating unit.

10. The curable composition of claim 9 wherein the liquid siloxane is a composition of the formula:

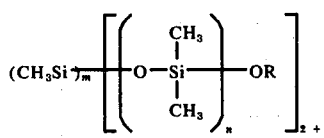

wherein m and n are as defined in claim 9, and wherein R is alkyl.

11. The curable composition f claim 1 wherein said composition contains a fibrous reinforcing filler.

12. The curable composition of claim 11 wherein said fibrous reinforcing filler in glass.

13. The cured composite produced by curing the curable composition of claim 1.

14. The cured composition produced by curing the curable composition of claim 2.

15. The cured composite produced by curing the curable composition of claim 3.

16. The cured composite produced by curing the curable composition of claim 4.

17. The cured composite produced by curing the curable composition of claim 5.

18. The cured composition produced by the curing the curable composition of claim 6.

19. The cured composite produced by curing the curable composition of claim 7.

20. The cured composite produced by curing the curable composition of claim 8.

21. The cured composite produced by curing the curable composition of claim 9.

22. The cured composited produced by curing the curable composition of claim 10.

23. The cured composite produced by curing the curable composition of claim 11.

24. The cured composite produced by curing the curable composition of claim 12.

* * * * *